United States Patent [19] [11] 3,989,786
Mehnert et al. [45] Nov. 2, 1976

[54] METHOD FOR REMOVING SURPLUS PLASTIC MATERIAL FROM THE NECK PORTIONS OF BLOW MOLDED BOTTLES OR THE LIKE

[75] Inventors: Gottfried Mehnert; Hermann Reuel, both of Berlin, Germany

[73] Assignee: Gottfried Mehnert, Berlin, Germany

[22] Filed: Nov. 6, 1974

[21] Appl. No.: 521,420

[30] Foreign Application Priority Data
Nov. 3, 1973 Germany............................ 24155042
Mar. 30, 1974 Germany............................ 23551146

[52] U.S. Cl.................................... 264/98; 264/99; 264/161; 264/334; 425/DIG. 204; 425/DIG. 212; 425/DIG. 232; 425/806
[51] Int. Cl.²................... B29C 17/07; B29C 17/12
[58] Field of Search................... 264/89, 90, 92, 94, 264/96–99, 334, 161; 425/302 B, 326 B, 387 B, DIG. 204, DIG. 212, DIG. 232, 806 A

[56] References Cited
UNITED STATES PATENTS

| 2,994,103 | 8/1961 | Schaich................................ 264/99 |
| 3,487,501 | 1/1970 | Siard et al........................ 264/161 X |
| 3,657,406 | 4/1972 | Delebarre............................ 264/98 |
| 3,752,628 | 8/1973 | Hafele et al...................... 425/302 B |

Primary Examiner—Jan H. Silbaugh
Attorney, Agent, or Firm—Michael J. Striker

[57] ABSTRACT

Annular surplus material which is separated from a parison section in the cavity of a blow mold in response to penetration of a blowing mandrel into the neck mold of the blow mold in a blow molding apparatus is stripped off the mandrel during the last stage of movement of the mandrel to an upper end position and subsequent to complete opening of the blow mold so as to allow a freshly formed plastic container to descend by gravity and to move sideways out of alignment with the mandrel. The mandrel has a cylindrical calibrating portion which cooperates with the neck mold to press mold the neck portion of the container prior to blowing, and a smaller-diameter lower end portion which guides the container during the initial stage of gravitational descent onto a conveyor or into a receptacle. The annular surplus material extends into a circumferential groove of the mandrel above the calibrating portion and is integral with radially extending surplus material which penetrates into pockets between the sections of the neck mold in response to closing of the blow mold around a large-diameter parison section. The blow mold is partly opened prior to lifting of the calibrating portion out of the neck portion of the container whereby the volume of the pockets increases and the radially extending surplus is more likely to share the upward movement of annular surplus material.

8 Claims, 12 Drawing Figures

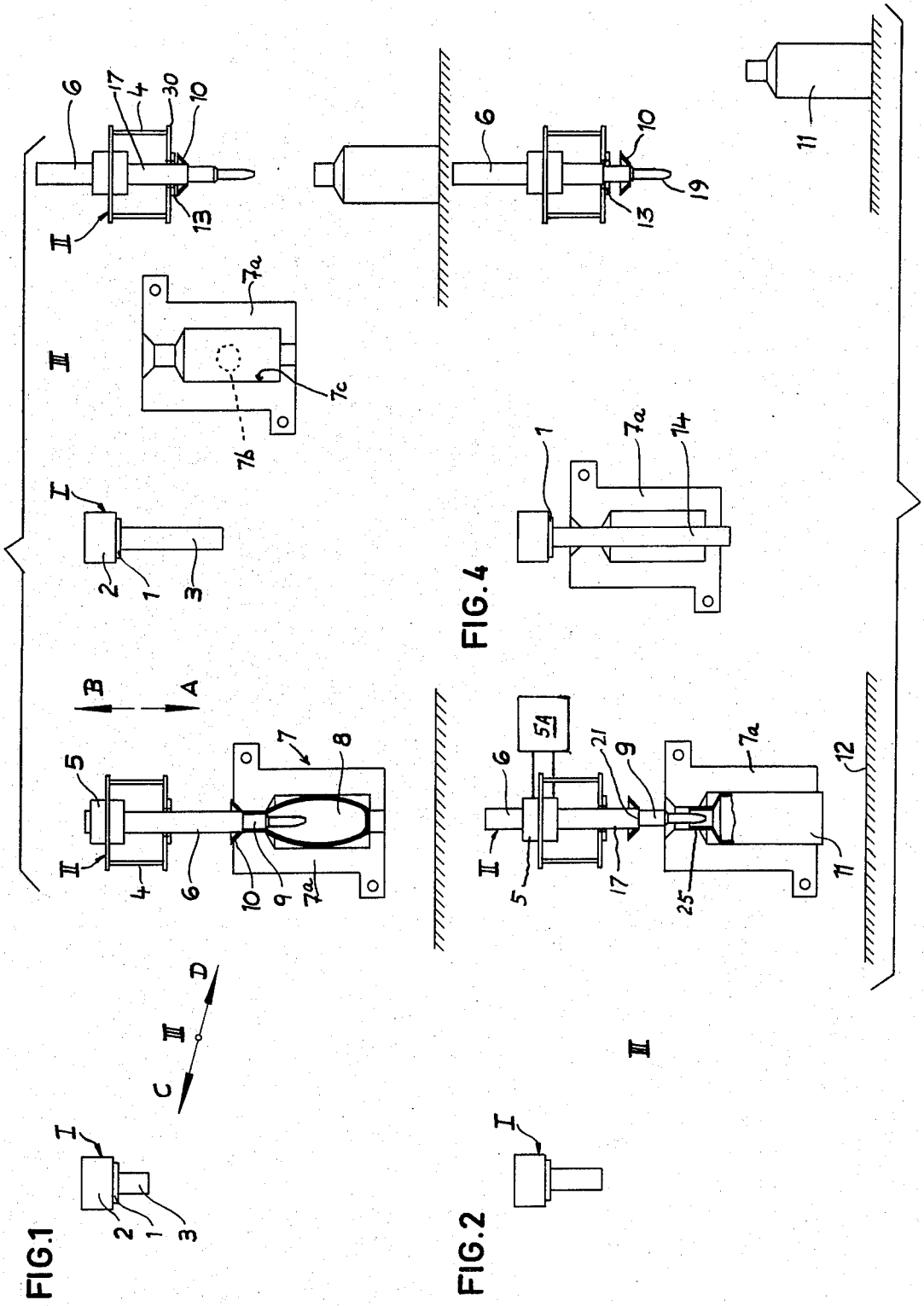

METHOD FOR REMOVING SURPLUS PLASTIC MATERIAL FROM THE NECK PORTIONS OF BLOW MOLDED BOTTLES OR THE LIKE

BACKGROUND OF THE INVENTION

The present invention relates to a method for blow molding hollow plastic articles, and more particularly to improvements in a method and apparatus for blow molding plastic articles which constitute or resemble bottles, canisters or analogous containers wherein a neck portion defines a passage for introduction or evacuation of flowable contents.

In many presently known blow molding apparatus, a mold having partible mold sections is employed to transport sections of a continuously or intermittently extruded tubular parison from an extruding station to a blowing station at which a blowing and calibrating mandrel penetrates into one end of the confined parison section to thereby shape the neck portion of the article. The making of the article is completed by blowing air into the interior of the parison section so that the latter conforms to the outline of the cavity in the mold. The mold is thereupon opened and the finished article removed from the mandrel so that it can descend onto a conveyor or into a stationary receptacle. The parison section which is transported by the mold from the extruder toward a position of register with the mandrel may be open at one or both ends and may be partially expanded to form a so-called bubble or cell prior to removal from the extruding station.

The mandrel which is caused to penetrate into the open end of the parison section or bubble in the mold cavity has a calibrating portion which causes the material of the parison section to move radially outwardly and to completely fill the space between such calibrating portion and the adjacent sections of the so-called neck mold which may be integral with or is separably secured to the corresponding sections of the blow mold. This insures that the neck portion of the thus-deformed parison section or bubble assumes a predetermined configuration, e.g., a tubular formation having external threads which can mesh with the internal threads of a cap or the like. Complete filling of the just-mentioned space with plastic material is desirable and necessary in order to insure that each article of a series of successively produced articles is formed with a neck portion of identical shape. It will be seen that, in contrast to the formation of the major part of a blow molded article (by expansion in response to introduction of a gaseous blowing medium into the parison section below the neck mold sections), the neck portion of the article is formed by press molding, i.e., by mechanically expanding the plastic material of that part of a parison section in the cavity of the blow mold which receives the calibratiing portion of the mandrel. Reference may be had to commonly owned U.S. Pat. No. 3,209,401 to Mehnert.

The just-described press molding of neck portions of blow molded articles invariably produces some surplus which extends upwardly beyond the neck portion and is normally separated from the neck portion by an annular cutting edge or shoulder of the mandrel in cooperation with a complementary surface or shoulder of the neck mold. As a rule, separation of the usually annular surplus is incomplete, i.e., the surplus adheres to the upper edge face of the neck portion by one or more thin webs. This is due to the fact that the severing action of the cutting edge is actually a squeezing or pinching action, not a true severing action. It is already known to retain the annular surplus on the mandrel until after the finished article is removed from the cavity of the blow mold and is caused to move out of the path of the surplus so that the latter can be separated from the mandrel and allowed to descent by gravity. This is disclosed, for example, in German Offenlegungsschrift No. 2,060,586.

Additional surplus develops when the articles are formed by blow molding of parisons whose outer diameter exceeds the inner diameter of the neck portion of the article, i.e., when the diameter of the parison must be reduced in the region which is to form the neck portion of the final product. The just-described mode of operation results in the formation of so-called "ears" which are flat pieces of surplus material extending substantially radially of the neck portion and filling specially designed recesses or pockets between the neck mold sections. In many instances, the ears extend beyond the neck mold section toward the main portion of the mold cavity so that the just-mentioned pockets must register with similar pockets between the main sections of the blow mold. Reference may be had to German Offenlegungsschrift No. 1,479,744.

The presently known proposals for removal of annular and flat surplus material which develops in the region of neck portions of blow molded articles are not entirely satisfactory for a number of reasons. Some of these proposals can be carried out by resorting to very complex and expensive auxiliary equipment which is prone to malfunction and requires frequent maintenance, especially when the surplus material is to be separated with a certain delay following expulsion of finished articles from the cavity of the blow mold in order to insure that the surplus material cannot adhere to the material of finished articles, for example, because the articles and/or the pieces of surplus material are still in a deformable state and tend to stick to each other.

SUMMARY OF THE INVENTION

An object of the invention is to provide a novel and improved method of removing surplus material from the neck portions of blow molded hollow plastic articles in such a way that the removal does not necessitate a reduction of the output and that the surplus material cannot come into contact with the finished products.

Another object of the invention is to provide a novel and improved method of removing annular and/or plate-like pieces of surplus material from blow molded plastic articles.

A further object of the invention is to provide a method of simultaneously detaching annular and plate-like pieces of surplus material from the neck portions of blow molded bottles, canisters or analogous containers.

An additional object of the invention is to provide a method employing blow molding apparatus with novel and improved means for removing surplus material from the neck portions of plastic bottles or the like.

Still another object of the invention is to provide a method employing novel and improved means for moving the blowing and calibrating mandrel in a blow molding apparatus.

Another object of the invention is to provide a method employing blow moldig apparatus wherein the entire surplus which develops in the region of the neck portion of a bottle or the like is removed in a single step and by resorting to simple, compact, inexpensive, rugged and reliable instrumentalities.

A feature of the invention resides in the provision of a method of removing surplus material from the neck portions or bottles or analogous containers which are produced in the cavity of a partible blow mold in cooperation with an elongated blowing mandrel. The method comprises the steps of confining a deformable open-ended tubular parison section consisting of synthetic thermoplastic material in the cavity of the blow mold so that the open end of the parison section constitutes the upper end of the parison section (the parison section can be transferred into the cavity of the blow mold by moving the mold into register with an extruder and thereupon into register with the mandrel or by moving the extruder relative to the blow mold), introducing the mandrel into the open end of the confined parison section whereby the mandrel cooperates with the blow mold to press mold a first portion of the parison section which is adjacent to the open end with attendant formation of annular surplus material which surrounds the mandrel and is at least partially separated from the press molded portion of the parison section, introducing through the mandrel a blowing fluid to expand the remaining portion of the confined parison section so that the latter is converted into a container having a neck portion which is constituted by the press molded portion, moving the mandrel and the mold relative to each other lengthwise of the mandrel to thereby shift the annular surplus material away from the neck portion of the container in the blow mold, opening the blow mold to permit the container to descend by gravity, and moving the mandrel lengthwise and simultaneously separating the surplus material from the mandrel, e.g., by moving the mandrel relative to a stationary stripping plate or the like.

The steps of moving the mandrel and the mold relative to each other and of moving the mandrel lengthwise preferably comprise moving the mandrel upwardly by resorting to a fluid-operated motor or the like.

The method may futher comprise the step of moving the container sideways outside of the open blow mold, i.e., subsequent to the opening step, and prior to moving the madrel lengthwise so tht the separated surplus material can descend by gravity without falling onto the container.

Still further, the method may comprise the steps of moving the mandrel upwardly to an intermediate position upon completion of the first moving step and prior to start of the second moving step (during which the surplus material is separated from the mandrel), and maintaining the mandrel in the intermediate position until after completion of the step of moving the container sideways.

The mold may be partially opened prior to the first moving step and to such an extent that the container remains confined in the mold cavity, i.e., that the container is unable to descend from the level of the blow mold under the action of gravity. The just-mentioned step is especially desirable and advantageous when the partible mold has recesses for additional surplus material which penetrates into the recesses as a result of closing of the mold around a large-diameter parison section and which adheres to annular surplus material because the upper sides of the recesses are open (such resses may be provided in the abutting surfaces of the sections of the so-called neck mold which constitutes the upper portion of the blow mold and cooperates with a cylindrical calibrating portion of the mandrel to press mold the neck portion of the container). The step of partially opening the blow mold prior to complete opening and prior to the first moving step then results in an increase of the volume of the aforementioned recesses so that the additional surplus material is free to move away from the neck portion of the still confined container in response to initial movement of the blowing mandrel.

The first moving step preferably immediately follows the step of partially opening the blow mold.

The first moving step may comprise partially withdrawing the mandrel from the container so that the lowermost portion of the mandrel continues to extend into the container subsequent to the opening step in order to guide the container during the initial stage of movement under the action of gravity. This insures that the container is less likely to tilt, to keel over or to otherwise change its orientation to an appreciable extent while it descends onto a conveyor or into a receptacle.

The extent to which the mandrel is moved lengthwise during the first moving step preferably equals or exceeds the axial length of the neck portion of a container in the blow mold. The lowermost portion of the mandrel preferably extends into the neck portion of the container with at least some clearance as soon as the calibrating portion is lifted above the neck portion.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWING

FIG. 1 is a schematic elevational view of certain parts of a blow molding apparatus which embodies one form of the invention, showing the mandrel in a lower end position in which its calibrating portion cooperates with the neck mold of the blow mold to press mold the neck portion of a plastic container;

FIG. 2 is a similar schematic elevational view, with the mandrel shown in an intermediate position prior to opening of the blow mold;

FIG. 3 is a similar schematic elevational view showing the blow mold in an intermediate position between the mandrel and the extruder;

FIG. 4 is a similar schematic elevational view, with the blow mold shown in register with the extruder;

DESCRIPTION OF THE PREFERRED EMBODIMENTS

Figure 5:
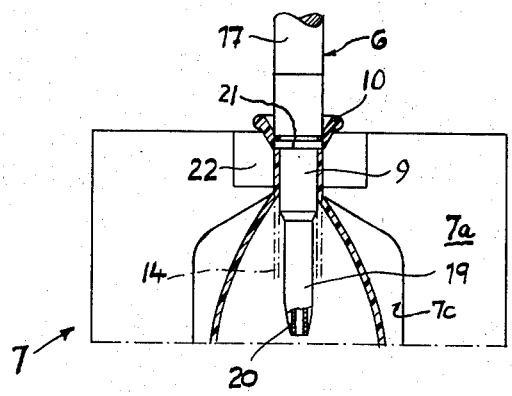
FIG. 5 is an enlarged view of a detail of FIG. 1.

The blow molding appratus of FIGS. 1 to 4 comprises an extruder 2 having a nozzle 1 which discharges a deformable tubular parison 3, either continuously or intermittently. The extruder 2 is mounted at a first station I. A blowing mandrel or blow tube 6 is mounted at a second station II and is movable up and down (as indicated by arrows B and A) by a drive including a reversible fluid-operated motor 5 and a suitable control system 5A (FIG. 3) which can move the mandrel stepwise at predetermined intervals and through distances of predetermined length. The control system 5A may comprise a source of pressurized fluid and a valve block whose valves regulate the admission of pressurized fluid to and the evacuation of spent fluid from the motor 5. If the space above the motor 5 is limited, the motor may constitute a rotary hydraulic motor which drives a spindle nut or a pinion in mesh with external threads or with a toothed rack on the mandrel 6. If the mandrel 6 is mounted well below the ceiling, the motor 5 may constitute a double-acting cylinder and piston unit.

The apparatus further comprises a partible blow mold 7 which includes two mirror-symmetrical sections 7a (only one shown) which are movable toward and away from each other by fluid-operated cylinder and piston assemblies 7b (only one shown) or the like. Furthermore, the apparatus comprises means for moving the mold 7 in directions indicated by arrows C and D along a suitably inclined path III so that the mold can be moved into register with the extruder 2 or into register with the blowing mandrel 6. For example, the mold 7 can be mounted on a carriage which is movable along a downwardly inclined path during transport of the mold toward a position of register with the mandrel 6 and along the same path but in the opposite direction during movement of the mold toward a position of register with the extruder 2.

The motor 5 for the blowing mandrel 6 is mounted in a stationary frame 4 having a crosshead 30 which supports an annular plate-like stripping device 13. The device 13 surrounds the mandrel 6 with a certain amount of clearance which is too small to permit the passage of annular surplus material 10 adhering to the mandrel 6 while the latter performs the last stage of its movement toward the upper end position shown in FIG. 4. The lower end position of the mandrel 6 is shown in FIG. 1, and two intermediate positions of this mandrel are respectively shown in FIGS. 2 and 3.

When the mandrel 6 dwells in the lower end position of FIG. 1, its cylindrical intermediate or calibrating portion 9 cooperates with a neck mold 22 (FIG. 5) of the blow mold 7 to press mold the neck portion 25 of a finished plastic container 11. A smaller-diameter lower end portion 19 of the mandrel 6 then extends well into the lower portion of the parison section in the cavity 7c of the blow mold 7; the end portion 19 constitutes an elongated guide for containers 11 and is formed with an axially extending bore or channel 20 (FIG. 5) which admits a gaseous blowing fluid to complete the conversion of a parison section in the cavity 7c into a container. FIG. 1 shows the parison section in a partly expanded condition in which the section resembles a bubble or preform 8. While the calibrating portion 9 penetrates into the open upper end of the parison section in the cavity 7c, it expands the respective portion of the parison section radially outwardly whereby the space between the calibrating portion 9 and the sections of the neck mold 22 is filled with plastic material and some material which forms the aforementioned annular surplus 10 is at least partially separated from the neck portion by an annular cutting edge or shoulder 21 between the calibrating portion 9 and a larger-diameter upper end portion or shank 17 of the blowing mandrel. The shoulder or cutting edge 21 provides the neck portion 25 of the container 11 with a relatively smooth upper end face 25' (FIG. 6) which might but need not adhere to the annular surplus material 10 by one or more relatively thin webs. During partial or complete separation of annular surplus material 10 from the neck portion 25, the adjacent portions of sections of the neck mold 22 constitute a counterknife for the cutting edge 21 of the mandrel 6.

In FIG. 2, the mandrel 6 is shown in a partly raised position in which the calibrating portion 9 is located slightly above the neck portion 25, i.e., the stroke of the mandrel between the positions of FIGS. 1 and 2 is longer than the neck portion 25. The surplus material 10 adheres to the shank 17 above the cutting edge 21 because it shares the upward movement of the mandrel, even if a small portion thereof adheres to the end face 25' of the neck portion 25 while the mandrel 6 still dwells in the position of FIG. 1. This is due to the provision of holding means on the shank 17; such holding means insures that the surplus material 10 invariably shares the upward movement of mandrel 6 from the lower end position of FIG. 1. The blow mold 7 is still closed or nearly fully closed so that the container 11 in its mold cavity cannot rise with the mandrel. The blow mold 7 is thereupon opened (i.e., one or both sections 7a move at right angles to the plane of FIG. 2) so that the finished container 11 can descend by gravity, e.g., onto a conveyor 12 or into a collecting receptacle which may move sideways between a plurality of different positions in each of which it can intercept a freshly formed container.

The open blow mold 7 thereupon moves in the direction indicated by arrow C (see FIG. 3) toward the extruder 2 at the station. I. During such movement of the mold 7, the mandrel 6 is lifted to a further intermediate position (shown in FIG. 3) in which it remains for a certain interval of time which is preferably sufficiently long to allow for complete or nearly complete setting of surplus material 10. In such second intermediate position, the shank 17 of the mandrel 6 can maintain the surplus material 10 close to or immediately below the stripping device 13.

The last stage of a complete cycle is shown in FIG. 4. The blow mold 7 is fully open and its sections 7a flank the freshly extruded parison section 14 which depends from the nozzle 1 of the extruder 2. The conveyor 12 has moved the previously formed container 11 out of register with the mandrel 6 so that the motor 5 can move the mandrel to the upper end position in which the device 13 strips the surplus material 10 off the shank 17 and the material 10 descends onto the conveyor 12 behind the freshly formed article. The inner diameter of the surplus material 10 is larger than the outer diameter of the calibrating portion 9 and/or guide portion 19 so that the portions 9, 19 cannot interfere with gravitational descent of material 10 onto the conveyor 12. The lifting of mandrel 6 to the upper end position (and the resulting stripping of surplus material 10) can take place simultaneously with or prior to arrival of the open blow mold 7 into a position of register with the nozzle 1. All that counts is to insure that the material 10 will not be separated from the mandrel 6 before the freshly formed container 11 is moved out of the way, i.e., laterally with respect to the mandrel 6, so that it cannot come into contact with the descending material 10. This is desirable because the material 10 is likely to adhere to the container 11 if it (or the container) is still in a deformable state.

The purpose and function of the lower end portion 19 of the blowing mandrel 6 will be understood with reference to FIG. 2. It will be seen that, when the calibrating portion 9 is already lifted above the neck portion 25 of the freshly formed container 11, the end portion 19 extends into the neck portion 25 with at least some clearance so that the container 11 is free to descend by gravity as soon as the sections 7a of the mold 7 are moved apart by the respective cylinder and piston assemblies 7b. If the container 11 is formed with a lateral handle, if the distribution of material is not entirely uniform around the axis of the container, or if the container does not have a truly circular cross-sectional outline, it is likely to tilt or overturn during movement toward the conveyor 12. It has been found that the tendency of a container to tilt, overturn or otherwise change its orientation is most pronounced immediately after the blow mold opens, i.e., during the initial stage of movement from the level of the mold cavity 7c toward the conveyor 12. The end portion 19 of the mandrel 6 constitutes an effective means for guiding the container during such critical initial stage of movement below the level of the cavity 7c whereby the container is much less likely to tilt or overturn, either before or during actual contact with the conveyor 12.

Proper or predictable orientation of containers 11 with respect to the conveyor 12 is desirable because it facilitates further processing of containers, e.g., their transport to a sterilizing, filling, labelling, capping, carton filling and/or other station. The conveyor 12 is preferably placed rather close to the lower end portion of the mold 7 in the lowermost position of this mold (i.e., while the latter is located below the frame 4 for the motor 5) to thus insure that the container 11 is less likely to rebound or impact against the conveyor, that the interval which is required for a container to descend from the mold cavity 7c onto the conveyor is relatively short, and that the container is less likely to change its orientation after its neck portion 25 descends below the lower end of the mandrel portion 19. As a rule, the extent of initial upward movement of the mandrel 6 (from the lower end position of FIG. 1 to the first intermediate position of FIG. 2) is just sufficient to insure that the calibrating portion 9 is located above the upper end of the neck portion 25; this renders it possible to reduce the overall length of the guide portion 19 because it is normally sufficient if the end portion 19 is as long as or slightly longer than the neck portion 25.

Figure 6:
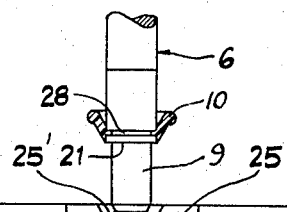
FIG. 6 is an enlarged view of a detail of FIG. 2.

FIGS. 5 to 8 show, on a larger scale, certain details of the just-described blow molding apparatus. As shown in FIGS. 5 and 6, the neck mold 22 also comprises two sections each of which is connected to and shares the movements of a mold section 7a. The aforementioned holding means for the surplus material 10 is a circumferential groove 28 which is machined into the peripheral surface of the shank 17 above the cutting edge 21 and is just deep enough to insure that the shank 17 can move the material 10 away from the upper end face 25' of the neck portion 25 when the mandrel 6 is caused to rise above the lower end position of FIG. 1 or 5. However, the depth of the groove 28 is not sufficient to prevent the stripping device 13 from terminating the upward movement of material 10 as soon as the latter reaches and abuts against the underside of the stripping device. The position of the mandrel 6 shown in FIG. 5 corresponds to the position of FIG. 1, and the position of mandrel 6 in FIG. 6 corresponds to that of FIG. 2. As mentioned above, the length of the upward stroke of the mandrel 6 from the position of FIG. 1 or 5 to that of FIG. 2 to 6 equals or slightly exceeds the length of the calibrating portion 9 and neck portion 25; this insures that the neck portion 25 then surrounds the guide portion 19 with a certain clearance. The guide portion 19 is optional; it is normally provided as a precautionary measure when the containers are fully symmetrical and the distribution of material therein is uniform, and such guide portion is desirable and advantageous when the containers exhibit a pronounced tendency to tilt or overturn in response to opening of the blow mold 7.

Figure 7:
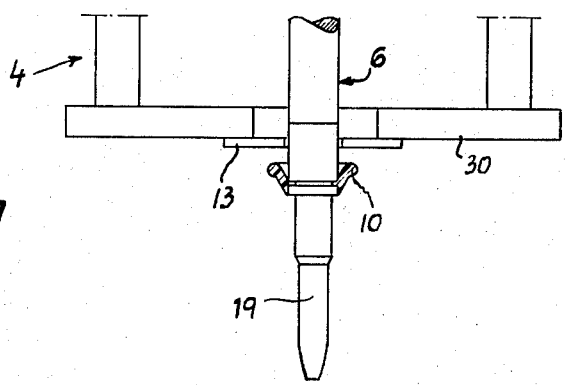
FIG. 7 is an enlarged view of a detail of FIG. 3.
Figure 8:
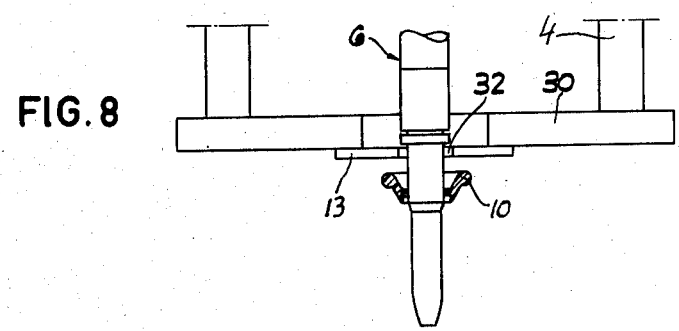
FIG. 8 is an enlarged view of a detail of FIG. 4.

FIG. 7 shows the mandrel 6 in the second or upper intermediate position. The length of the upward stroke between the intermediate positions of FIGS. 6 and 7 may be approximately 100 millimeters. The mandrel 6 remains in the position of FIG. 7 for an interval of time which is needed to move the container 11 on the conveyor 12 laterally and out of a position of register with surplus material 10 on the shank 17. Upon completion of such sidewise movement of the container 11, the mandrel 6 is lifted again (see FIG. 8) so that the material 10 engages with and is held against further movement by the stripping device 13. The groove 28 moves above and away from the material 28 whereby the latter descends by gravity onto the conveyor 12 behind the corresponding container or into an intercepting receptacle which can be moved below the mandrel 6 as soon as the container is out of the way. The opening of stripping device 13 is shown at 32; this opening is large enough to permit the passage of shank 17 but is too small to permit the passage of suplus material 10.

The step which is shown in FIGS. 3 and 7 can be omitted, i.e., the mandrel 6 can be moved directly from the intermediate position of FIG. 2 or 6 to the upper end position if the container 11 and annular surplus 10 are fully self-supporting when the mold 7 is opened to allow the container to descend onto the conveyor 12. Thus, the surplus 10 then descends onto or close to the container; however, eventual contact between such surplus and the container is of no consequence because the material of both is sufficiently hard to prevent any damage to or deformation of the container as a result of its coming into contact with the surplus. Also, the step of moving the mandrel 6 to the second intermediate position of FIG. 3 or 7 can be omitted if the movement of mandrel 6 from the intermediate position of FIG. 2 or 6 to the upper end position is synchronized with the movement of conveyor 12 in such a way that the container 11 is invariably moved out of alignment with the mandrel before the stripping device 13 engages and arrests the ascending surplus material 10.

An advantage of the step of and means for lifting the mandrel 6 in several stages or steps is that the surplus material 10 can be separated from the neck portion 25 before the latter is completely self-supporting. This contributes to higher output of the apparatus but without permitting any (or any appreciable) deformation of the neck portion 25 because the latter is still confined in the neck mold 22 while the mandrel 6 performs the first stage of its movement from the lower end position. The fact that the neck portion 25 is (or might be) in a deformable state during lifting of surplus material 10 is of no consequence because, as a rule, the material 10 is completely or practically completely separated from the containers 11.

FIGS. 9 to 12 show a portion of a second blow molding apparatus having a modified blow mold 33 including two mirror-symmetrical sections 33a, 33b abutting against each other in a vertical plane T when the mold is closed. The mold 33 cooperates with a blowing mandrel 45 which is analogous to the mandrel 6 except that it does not have a guide portion for descending containers. However, such guide portion may be provided if the nature of containers is such that they exhibit a pronounced tendency to change orientation during movement by gravity onto a conveyor 48 or the like. The neck mold is made integral with the blow mold 33, i.e., the upper part of each of the mold sections 33a, 33b constitutes a section of the neck mold wherein the neck portion 43 of a container 47 is press molded in cooperation with the calibrating portion 45a of the mandrel 45. The diameter of the calibrating portion 45a is larger than the inner diameter of the parison section; therefore, a substantial amount of material of the parison section is moved radially outwardly when the mandrel is caused to penetrate into the upper end of such parison section in the cavity 34 of the mold 33. The excess of plastic material forms two types of surplus, namely the aforediscussed annular surplus material 44 which is located above the cutting edge 42 and surrounds the shank 45b of the mandrel 45, and two plate-like pieces or ears 40 which extend radially of the neck portion 43 and are integral with the annular surplus 44. This is due to the fact that the ears 40 are formed in specially provided recesses or pockets 37 machined into the abutting surfaces of mold sections 33a, 33b and open at their upper ends so that the upper edges of the ears 40 can contact the normally conical or substantially conical underside of the annular surplus 44. Each of the pockets 37 consists of two mirror-symmetrical halves which are provided in the neighboring surfaces of the mold sections 33a, 33b, and more particularly in the neighboring surfaces of the uppermost parts of sections 33a, 33b which constitute the sections of the neck mold. If the amount of surplus material is quite pronounced, the pockets 37 may extend downwardly along portions of the mold cavity 34 immediately below the neck mold, i.e., along the downwardly and outwardly inclined surfaces 38 bounding the mold cavity in the region where the container 47 in the mold 33 includes an upwardly tapering portion connecting the neck portion 43 with the main body portion.

Figure 9:
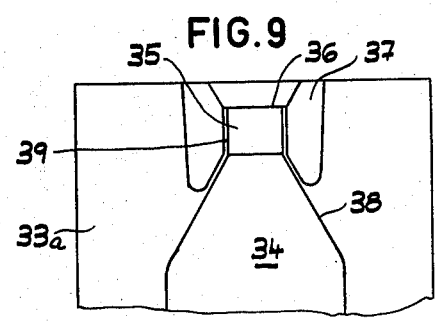
FIG. 9 is an elevational view of a portion of one section of a modified blow mold.
Figure 10:
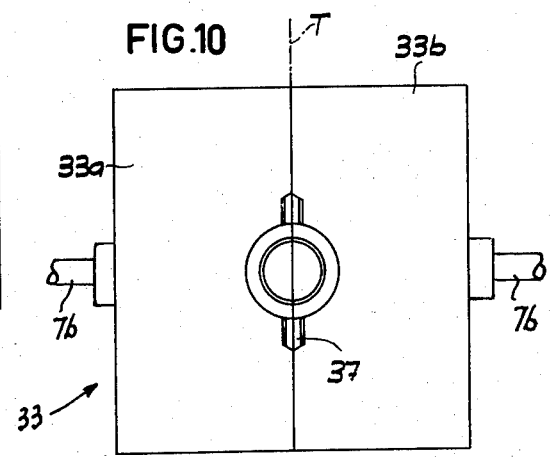
FIG. 10 is a plan view of the blow mold which includes the section of FIG. 9.
Figure 11:
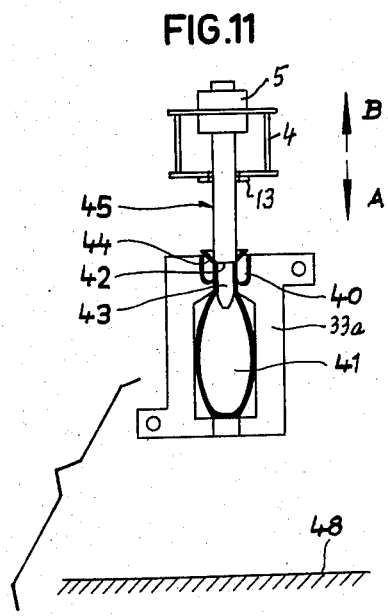
FIG. 11 is a fragmentary schematic elevational view of a blow molding apparatus which employs the mold of FIGS. 9 and 10, the mandrel being shown in its lower end position in which the calibrating portion cooperates with the neck mold of the blow mold.

In FIG. 9, the reference character 35 denotes the internal surface of the neck mold section which forms part of the blow mold section 33a. The shoulder 36 at the upper end of the surface 35 cooperates with the cutting edge 42 of the mandrel 45 to sever or to practically completely separate the annular surplus 44 from the neck portion 43 when the mandrel 45 moves to the lower end position shown in FIG. 11. The neck mold sections are preferably formed with pinching edges 39 which effect at least partial separation of ears 40 from the neck portion 43.

The outer diameter of a parison section which is to be converted into a container 47 is assumed to be larger than the diameter of the cylindrical surface including the surfaces 35. Therefore, when the mold sections 33a, 33b are caused to move toward each other to assume the positions shown in FIG. 10, the confined parison section is deformed and some of its material fills the pockets 37 to form the ears 40. Such ears are completely or nearly completely separated from the plastic material in the neck mold by the pinching edges 39. The mandrel 45 is then caused to move to the lower end position shown in FIG. 11 whereby its cutting edge 42 cooperates with the shoulder 36 to separate or substantially separate the annular surplus 44 from the top end face of the neck portion 43. The annular surplus 44 is integral with the ears 40 because the upper ends of the pockets 37 are open. The neck portion 43 is formed by press molding in the same manner as described in connection with FIGS. 1 to 8. The shank 45b of the mandrel 45 may be provided with an annular groove or with analogous holding means for the annular surplus 44 to thus insure that the surplus 44 rises with the ears 40 when the mandrel 45 is moved to the intermediate position shown in FIG. 12, i.e., subsequent to conversion of the parison section first into a bubble or preform 41 shown in FIG. 11 and thereupon into a finished article or container 47.

Figure 12:
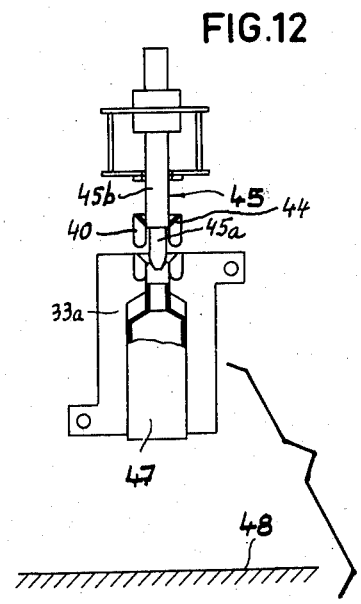
FIG. 12 illustrates the structure of FIG. 11 but with the mandrel shown in an intermediate position.

In accordance with a feature of the invention, the mold 33 is partially opened prior to lifting of the mandrel 45 to the intermediate position of FIG. 12. This results in an increase of the volume of pockets 37 so that the surfaces bounding the pockets offer less resistance to upward movement of ears 40 with the ascending annular surplus 44. The opening of mold 33 is only partial, i.e., it is not sufficient to allow the container 47 to rise with the mandrel 45 but is of considerable help in insuring that the ears 40 will be removed from the respective pockets 37 simultaneously with upward movement of the mandrel 45 and annular surplus 44. For example, the extent of partial opening of the mold 33 before the mandrel 45 leaves the lower end position of FIG. 11 may be in the range of 1–5 millimeters, depending on the dimensions of containers 47. The partial opening of mold 33 results in a movement of pinching edges 39 away from the adjacent webs which connect the ears 40 with the annular surplus 44 (provided that the ears are not completely separated from the neck portion 43) whereby the mold offers even less resistance to upward movement of the ears together with the annular surplus 44.

In the next step, the sections 33a, 33b are moved to their fully open positions so that the container 47 can descend onto the conveyor 48.

It is often desirable to operate the apparatus of FIGS. 9 to 12 in such a way that a partial opening of mold sections 33 is immediately or practically immediately followed by lifting of the mandrel 45 above its lower end position. Such mode of operation is preferred for the following reason: When the mold 33 closes around a parison section (the extruder which produces a series of parison sections is not shown in FIGS. 9–12), abrupt contact between the surfaces of the mold and the material which forms the ears 40 results in very pronounced and rapid cooling of the ears so that they are rather brittle and can be readily separated from the neck portion 43 (provided that they do adhere to the neck portion by one or more thin webs) in response to lifting of the annular surplus 44. However, when the mold 33 dwells in the partly open position, a substantial amount of heat energy is radiated from the main portion of the container 47 in the mold cavity 34 whereby such heat is likely to soften the material of the ears 40 and to thus reduce the likelihood of their removal together with the annular surplus 44. If the mandrel 45 is lifted immediately after the mold sections 33a, 33b complete their movement to partly open positions, the interval of time between partial opening of mold 33 and lifting of mandrel 45 is insufficient to permit appreciable softening of plastic material in the pockets 37.

Without further analysis, the foregoing will so fully reveal the gist of the present invention that others can by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A method of removing surplus material from the neck portions of bottles or analogous containers which are produced in the cavity of a partible blow mold in cooperation with an elongated blowing mandrel, comprising the steps of confining a deformable open-ended tubular parison section of synthetic thermoplastic material in the cavity of the mold so that the open end of the section constitutes the upper end thereof; introducing the mandrel into the open end of the confined section whereby the mandrel cooperates with the mold to press mold a first portion of the section which is adjacent to the open end with attendant formation of annular surplus material which surrounds the mandrel and is at least partially separated from the press molded portion; introducing through the mandrel a blowing fluid to expand the remaining portion of the confined section so that the latter is converted into a container having a neck portion which is constituted by said press molded portion; moving the mandrel lengthwise through a first distance, thereby only partially withdrawing the mandrel from said mold to shift the surplus material away from the neck portion while retaining and end portion of the mandrel in the container; thereupon opening the mold to permit the container to descend by gravity while being guided by said end portion of said mandrel; and only subsequently moving the mandrel lengthwise through a second distance and simultaneously separating the surplus material from said mandrel.

2. A method as defined in claim 1, wherein said steps of moving the mandrel comprise moving the mandrel upwardly.

3. A method as defined in claim 2, said end portion of said mandrel including a guide section located in the interior of the container; and wherein said first moving step comprises withdrawing the mandrel to an extent which at least equals the axial length of the neck portion of the container in the blow mold, so that said guide section is lodged with clearance in said neck portion of the container upon completion of said first moving step.

4. A method as defined in claim 2, further comprising the step of moving the container sideways outside of the mold subsequent to said opening step and prior to moving the mandrel lengthwise so that the separated surplus material can descend by gravity without falling onto the container.

5. A method as defined in claim 4, further comprising the steps of moving the mandrel upwardly to an intermediate position upon completion of said first moving step and prior to start of said second moving step, and maintaining the mandrel in said intermediate position until after the completion of said step of moving the container sideways.

6. A method as defined in claim 2, further comprising the step of partially opening the mold prior to said first moving step and to an extent which is less than that necessary to permit the container to leave the cavity under the action of gravity.

7. A method as defined in claim 6 of removing surplus material from the neck portions of bottles or analogous containers which are produced in the cavity of a partible mold having recesses for additional surplus material which enters such recesses as a result of closing of the mold around a parison section and which adheres to said annular surplus material, wherein said step of partially opening the mold includes slightly increasing the volume of said recesses so as to enable said additional surplus material to move away from the neck portion of the container together with said annular surplus material.

8. A method as defined in claim 6, wherein said first moving step immediately follows the step of partially opening the blow mold.

* * * * *